(12) United States Patent
Sheehan et al.

(10) Patent No.: US 10,176,331 B2
(45) Date of Patent: Jan. 8, 2019

(54) ENHANCED METADATA TO AUTHENTICALLY REPORT THE PROVENANCE OF A FILE

(71) Applicant: MICROSOFT TECHNOLOGY LICENSING, LLC, Redmond, WA (US)

(72) Inventors: John M. Sheehan, Redmond, WA (US); Vishal Agarwal, Redmond, WA (US); Crispin Cowan, Redmond, WA (US); Juan-Lee Pang, Redmond, WA (US); Greg Domzalski, Redmond, WA (US); David C. LeBlanc, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 15/179,536

(22) Filed: Jun. 10, 2016

(65) Prior Publication Data

US 2017/0357818 A1    Dec. 14, 2017

(51) Int. Cl.
*G06F 21/00* (2013.01)
*G06F 21/60* (2013.01)
*G06F 21/30* (2013.01)

(52) U.S. Cl.
CPC ............ *G06F 21/604* (2013.01); *G06F 21/30* (2013.01)

(58) Field of Classification Search
CPC ................................ G06F 21/604; G06F 21/30
See application file for complete search history.

(56) References Cited

U.S. PATENT DOCUMENTS

| | | |
|---|---|---|
| 6,092,201 A | 7/2000 | Turnbull et al. |
| 6,466,983 B1 | 10/2002 | Strazza |
| 6,799,272 B1 | 9/2004 | Urata |
| 7,546,276 B2 | 6/2009 | Randle et al. |
| 8,327,441 B2 | 12/2012 | Kumar et al. |
| 8,448,244 B1 | 5/2013 | Kukulski et al. |

(Continued)

FOREIGN PATENT DOCUMENTS

WO    2015056009 A1    4/2015

OTHER PUBLICATIONS

Musgrave, Devon, "Handling file/folder pickers and the web authentication broker in universal Windows apps", Published on: Jul. 28, 2014 Available at: http://blogs.msdn.com/b/microsoft_press/archive/2014/07/28/handling-file-folder-pickers-and-the-web-authentication-broker-in-universal-windows-apps.aspx.

(Continued)

*Primary Examiner* — Anthony D Brown
*Assistant Examiner* — William A Corum, Jr.
(74) *Attorney, Agent, or Firm* — Shook, Hardy & Bacon, L.L.P.

(57) ABSTRACT

Aspects of the technology described herein can provide enhanced metadata to authentically report the provenance of a file. An exemplary computing device may have a file broker to receive an indication from a first security principal to write a file to a file system. The file broker can use one file utility to write the file, but use another file utility to write an identification of the first security principal and its opinion about the file into metadata associated with the file. Subsequently, the identification of the first security principal and its opinion may be used to authentically report the provenance of the file and applied in other security applications.

20 Claims, 8 Drawing Sheets

(56) References Cited

U.S. PATENT DOCUMENTS

| | | | |
|---|---|---|---|
| 8,505,069 B1* | 8/2013 | Solodovnikov | G06F 8/65 709/224 |
| 8,850,517 B2 | 9/2014 | Kumar | |
| 2005/0149726 A1 | 7/2005 | Joshi et al. | |
| 2009/0106549 A1* | 4/2009 | Mohamed | G06F 21/6218 713/156 |
| 2010/0154026 A1* | 6/2010 | Chatterjee | G06F 21/126 726/1 |
| 2012/0144067 A1* | 6/2012 | Buckley | H04L 67/06 709/246 |
| 2014/0172808 A1* | 6/2014 | Burge | G06F 21/604 707/694 |
| 2014/0244803 A1 | 8/2014 | Kang et al. | |
| 2014/0298413 A1 | 10/2014 | Anderson et al. | |
| 2014/0304512 A1* | 10/2014 | Kotov | H04L 9/14 713/171 |
| 2015/0199510 A1 | 7/2015 | Krstic et al. | |
| 2016/0072796 A1* | 3/2016 | Adam | G06F 21/6281 713/159 |
| 2016/0188878 A1* | 6/2016 | Kulkarni | G06F 21/56 726/23 |
| 2017/0011220 A1* | 1/2017 | Efremov | G06F 21/554 |
| 2017/0111365 A1* | 4/2017 | Michael | H04L 63/102 |
| 2017/0351862 A1* | 12/2017 | Mohinder | G06F 21/57 |

OTHER PUBLICATIONS

Yason, Mark Vincent, "Diving Into Ie 10's Enhanced Protected Mode Sandbox", Published on: Aug. 4, 2014 Available at: https://www.blackhat.com/docs/asia-14/materials/Yason/WP-Asia-14-Yason-Diving-Into-IE10s-Enhanced-Protected-Mode-Sandbox.pdf.

* cited by examiner

ENHANCED METADATA TO AUTHENTICALLY REPORT THE PROVENANCE OF A FILE

BACKGROUND

Various applications are generally untrusted by design and are given less access to data and resources. This allows users to try out an unfamiliar application without worrying that the unfamiliar application may damage their data or devices. Some applications indeed should not be trusted. For example, some applications may collect sensitive user data without informing users.

However, some applications are more or less trustworthy than others. As an example, an essential word processing application from a well-known company is likely more trustworthy than a casual game application written by anonymous developers. Moreover, desktop applications may have different perspectives on the trustworthiness of their peer applications. For example, Microsoft Word® on a desktop computer and Microsoft Excel® on an Android® device may need to access a set of common files, while Adobe Illustrator® on the desktop computer may choose to trust Adobe Photoshop Express® on the Android® device due to their kinship.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various aspects, systems, methods, and computer-readable storage devices are provided to improve a computing device's ability to authentically report the provenance of a file and determine the appropriate measures to operate on the file accordingly. One aspect of the technology described herein is to improve the computing device's ability for recording an identification of a security principal and its opinion about the file into metadata associated with the file. Another aspect of the technology described herein is to improve the computing device's ability to manage such metadata associated with the file, such as replacing a portion of the metadata or appending new data to the metadata. Yet another aspect of the technology described herein is to improve the computing device's ability to authentically report the provenance of the file and determine the appropriate measures to operate on the file, e.g., based on the identification of the security principal and its opinion about the file.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
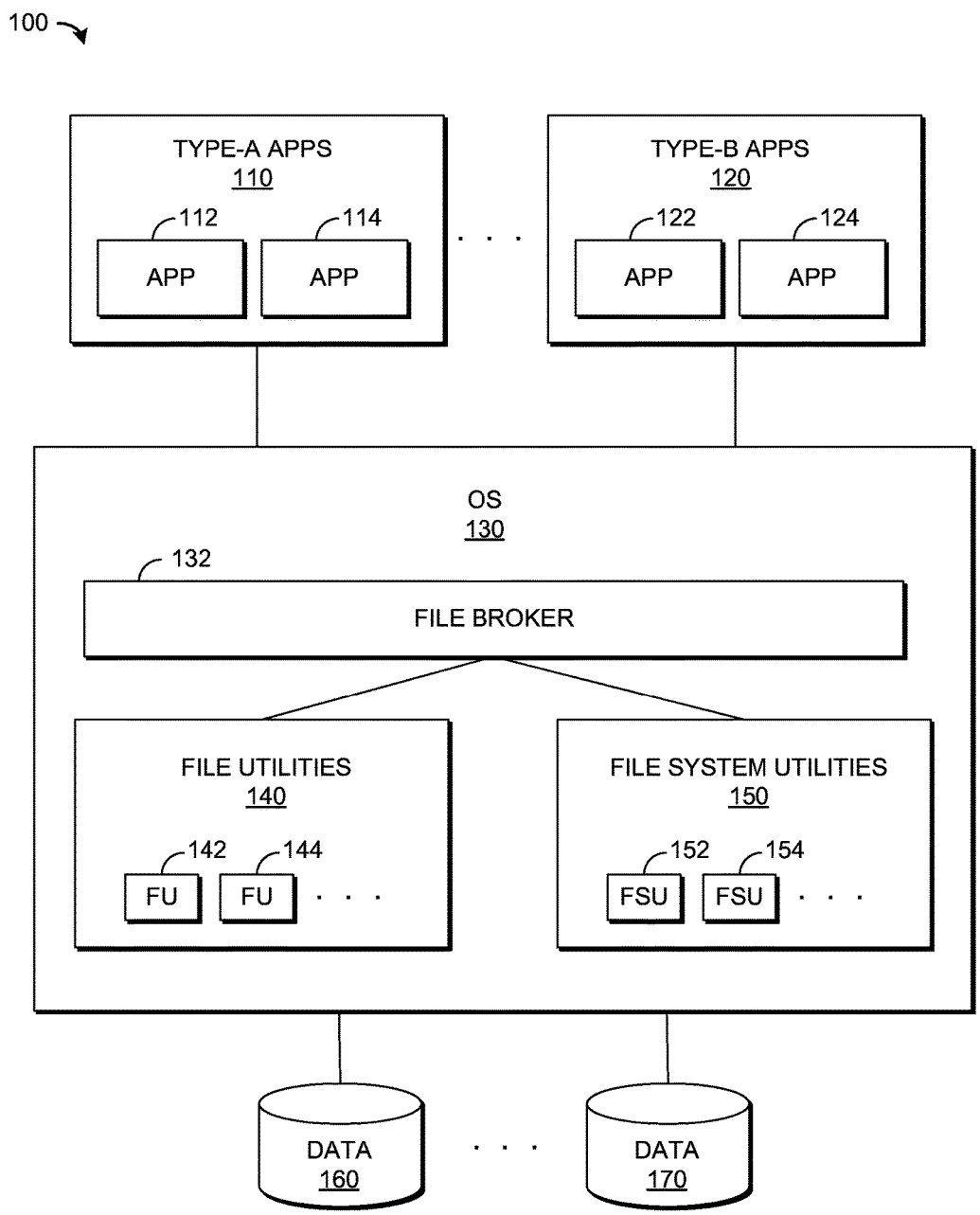
FIG. 1 is a block diagram of an example operating environment suitable for implementing aspects of the present disclosure.

The various technologies described herein are set forth with sufficient specificity to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The term "app" or "modern app", as used herein, refers to an application that runs with restricted security privileges, e.g., in a platform sandbox, while the term "application" refers to an application that runs with regular security privileges, e.g., with all of the privileges of the user. Coincidentally, mobile computing platforms (e.g., Android®, iOS®, etc.) emerged more recently and use modern "apps" more often than traditional non-mobile computing platforms (e.g., a server).

A sandbox is a traditional security mechanism for running modern apps, wherein a modern app typically will only receive a tightly controlled set of resources, such as scratch space on disk and memory. Network access, the ability to inspect the host system, or the ability to read from input devices is usually significantly restricted for modern apps running in a sandbox. For legacy reasons, not all application features are available to an app running in a sandbox.

By way of example, Desktop Office application may always treat files created by Modern Office app as untrusted, and open the file in a limited Preview Mode. As a result, users may have a suboptimal user experience. On one hand, desktop applications and modern apps need to be interoperable, e.g., accessing the same files. On the other hand, desktop applications and modern apps cannot mutually trust each other. As a result, desktop applications and modern apps cannot collaborate smoothly if files written by modern apps are always untrusted.

One of the legacy methods to convey trust in a file on local disk is using Mark of the Web (MotW). MotW was introduced in XP SP2 as part of Attachment Execution Service (AES), and MotW allows applications (e.g., web browsers, mail clients, etc.) to mark where a file came from, i.e., the "zone", e.g., the Internet zone. Although MotW supports marking "zone identifier" for a file, MotW cannot differentiate security treatments for a file based on different apps, e.g., to indicate that a particular app should trust a file for a particular reason and to a certain degree. Therefore, new technologies are needed to facilitate a computing platform simultaneously supporting a strong app sandbox model combined with a user file system where the provenance of files can be authentically reported.

In this disclosure, file metadata is enhanced to facilitate authenticating the provenance of a file. Specifically, the operating system can record the identification of the app that writes a file into the metadata associated with the file. In some embodiments, such metadata may be stored in a file system, which has extended metadata capabilities. In some embodiments, such metadata may be kept in a trusted database or some other appropriate data store.

In some embodiments, the result of a security determination by the app about the file can also be written into the metadata associated with the file. By way of example, the modern app platform usually gives an authentic and globally consistent identifier namespace for apps (e.g., the App Container), so that a file broker can utilize the technology of Mark of the App Container (MotAC). The MotAC technology allows that whenever a modern app writes a user file via the file broker, the file broker, as a privileged component of the operating system, can mark the file with the identifier of the app container to identify the modern app. Subsequently, when another app, e.g. Desktop Office or Internet Explorer (IE), opens the file on disk, the app can inspect the MotAC and decide whether it trusts the file written by the specific modern app. If the app accessing the file does not fully trust the modern app that wrote the file, the app can take appropriate defensive measures as necessary, e.g., open the file in a restricted mode.

A modern app can write data to a file. However, the modern app is not permitted to directly access metadata associated with the file, which can only be access by the operating system, e.g., via a file broker. The file broker can write the file through one channel, but write the metadata associated with the file through a different channel. By way of example, the New Technology File System (NTFS) supports multiple streams per file. There are two streams which are normally presented, e.g., one for data, and another for security information. There may be some number of additional streams, known as Alternate Data Streams (ADS). Therefore, over the NTFS, the file broker can additionally write the MotAC to the metadata associated with the file, e.g., via an ADS. As the modern app has no access to the ADS, the MotAC is immune from alteration by the modern app.

Further, the file broker can offer a new application programming interface (API) that allows the app to add to the ADS the opinion of the app about the file. This allows the app to convey its opinion of the security status of the file to other apps that may access the file. In some embodiments, the app's opinion includes an app-assigned zone identifier. In various embodiments, adding the identification of the app (e.g., MotAC) to the metadata associated with the file is mandatory, but adding the app's opinion of the file is optional.

Further, this disclosure adds APIs or other options that allow an app to query the identification (e.g., MotAC) of the app that wrote the file and the app's opinion of the file (e.g., the app-assigned zone ID). Based on the results returned by the file broker, the querying app can take defensive measures when accessing the file, such as using enhanced format checking (e.g., slower but more secure parsing), opening the file in a sandbox, disabling app features (e.g., embedded macros), and even declining to open the file. Additionally, antivirus products can scan for MotAC and app-assigned zone IDs to prioritize malware scanning.

Such query results can be trusted by the querying app because the identification of the app in the metadata associated with the file is under the control of the operating system. Apps have no write-access to such data, except data which it is allowed to write by specific APIs. Thus, when a querying app reads the identification of the app in the metadata associated with the file, the provenance of the file can be ascertained based on the true identity of the most recent app that wrote the file. Accordingly, the querying app can benefit from knowing the provenance of the file and the app-assigned zone ID, e.g., to deploy optional defensive measures depending on which app (e.g., MotAC) wrote the file and what the app said about the file (e.g., app-assigned zone ID).

Many platforms (e.g., Windows Store apps, iOS, Android, etc.) treat an app as a security principal. Advantageously, the notion of app identity can be incorporated into the metadata of a general-purpose user-visible file system to form an authentic and trustworthy mark of the provenance of a file (e.g., which app wrote the file). In turn, all other security principals are empowered to make reasoned security decisions about how to treat the file.

Having briefly described an overview of aspects of the technology described herein, an exemplary operating environment in which aspects of the technology described herein may be implemented is described below. Referring to the figures in general and initially to FIG. 1 in particular, an exemplary operating environment for implementing technology described herein is shown and designated generally as exemplary operating environment 100. The exemplary operating environment 100 is one example of a suitable computing environment and is not intended to suggest any limitation as to the scope of use or functionality of aspects of the technology described herein. Neither should the exemplary operating environment 100 be interpreted as having any dependency or requirement relating to any one component nor any combination of components illustrated.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes operating system (OS) 130, which supports various apps, including type-A apps 110 (e.g., App 112 and App 114) and type-B apps 120 (e.g., App 122 and App 124). Further, OS 130 also manages one or more file systems residing in data 160 and data 170 via file utilities (FU) 140 (e.g., FU 142 and FU 144) and file system utilities (FSU) 150 (e.g., FSU 152 and FSU 154). Additionally, OS 130 hosts file broker 132, which facilitates various apps to operate on files in file systems, such as reading or writing files.

It should be understood that operating environment 100 shown in FIG. 1 is an example of one suitable operating environment. In one embodiment, all of the components shown in FIG. 1 may be implemented in one computing device, such as computing device 800 described in connection to FIG. 8, for example. In some embodiments, some of the components shown in FIG. 1 may be implemented in different computing devices. By way of example, App 112 may operate from a local area network and access OS 130 remotely, and App 122 may operate from a remote mobile device and access OS 130 via Internet. By the same token, data 160 and data 170 may be located inside the same computing device as the OS 130 and distributed on the network. In general, these components depicted in FIG. 1 may communicate with each other via a bus (e.g., bus 810 depicted in FIG. 8) or via a network, which may include, without limitation, one or more local area networks (LANs) and/or wide area networks (WANs).

Operating environment 100 may be presented in any type of computing device capable of use by a user. For example, in one aspect, operating environment 100 may exist in the type of computing device described in relation to FIG. 8 herein. By way of example and not limitation, operating environment 100 may exist in a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

In various embodiments, type-A apps 110 include desktop applications. In this regard, App 112 may be a desktop word processing app, e.g., Microsoft Word, while App 114 may be a desktop spreadsheet app, e.g., Microsoft Excel. In various embodiments, type-B apps 120 include modern apps. In this regard, App 122 may be a mobile word processing app, e.g., Word Mobile app, while App 124 may be a mobile spreadsheet app, e.g., Excel Mobile app.

OS 130 is system software that manages computer hardware and software resources and provides common services for computer programs, e.g., type-A apps 110 and type-B apps 120. OS 130 may be a Unix or Unix-like operating system (e.g., BSD, Linux, etc.) in some embodiments. OS 130 may be a version of Microsoft Windows (e.g., Windows CE, Xbox OS, Windows 10, etc.) in other embodiments. OS 130 may also include other kinds of operating systems, such as BareMetal, BeOS, FreeMint, Haiku, Mac OS, MorphOS, OS/2, RISC OS, XTS-300, etc.

File broker 132 provides a system call interface for various apps to manage files and folders, such as reading or writing files to or from a file system. FSU 150 generally supports operations on file systems, such as mounting a file system, unmounting a file system, finding the root for a file system, getting the statistics of a file system, syncing the file system, etc. File broker 132 carries out specific functions through one or more file utilities and file system utilities. FU 140 may include various utilities for carrying out file-related operations, such as creating, reading, writing, renaming, moving, copying, deleting, and searching for files or file directories, as well as modifying metadata associated with files or file directories, including file attributes, properties, or file permissions. Depending on the underlying structure of the file system, FU 140 may be used to truncate data, truncate or extend space allocation, append to, move, and modify files in-place.

Apps may request a file operation via the system call interface provided by file broker 132. Subsequently, file broker 132 determines the appropriate file utilities or file system utilities to use and invokes them in a specific sequence to complete the file operation. In some embodiments, file broker 132 may use a separate file utility to write the metadata associated with a file, or otherwise prevent the app writing the file from altering or even accessing the metadata associated with the file. In various embodiments, file broker 132 may mandatorily record the identification of the app that wrote the file into the metadata associated with the file. Further, file broker 132 may additionally facilitate the app to save its opinion about the file into the metadata associated with the file.

Further, file broker 132 also supports additional system calls that allow other apps to query the identification (e.g., the MotAC) of the previous app that wrote the file and/or the opinion of the app about the file (e.g., the app-assigned zone ID). In this way, the querying app may ascertain the provenance of the file saved in data 160 or data 170, and take appropriate security measures based on the provenance of the file and/or the opinion of the app about the file when accessing the file, such as opening the file in a sandbox or disabling risky app features such as embedded macros.

Figure 2:
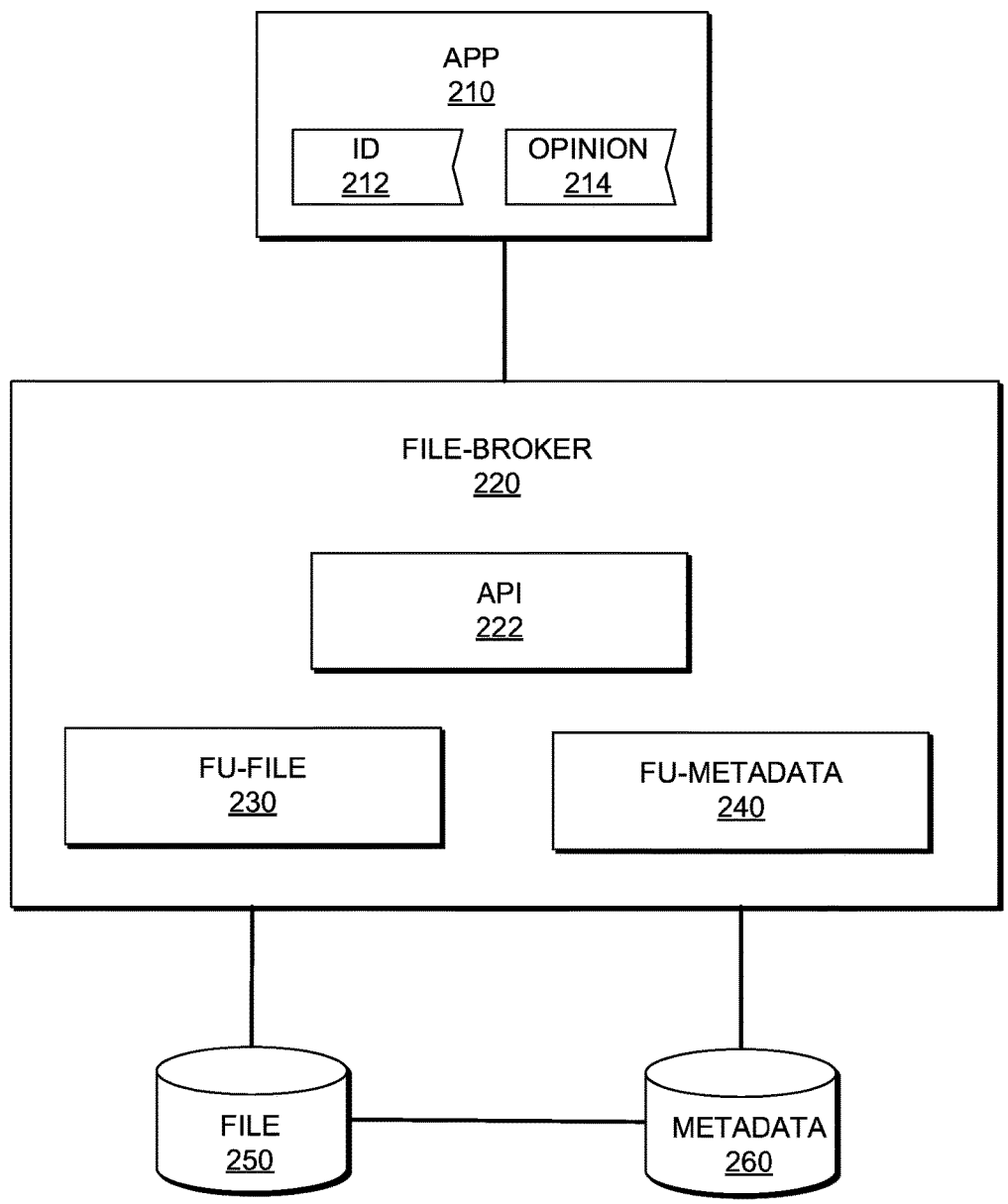
FIG. 2 is a block diagram depicting an example computing architecture suitable for implementing aspects of the present disclosure.

Referring now to FIG. 2, a block diagram is provided showing aspects of an example computing system architecture suitable for implementing an embodiment and designated generally as system 200. System 200 includes file broker 220, which can facilitate app 210 to write to file 250 as well as record the identification of app 210 (e.g., ID 212) and its opinion of file 250 (e.g., opinion 214) into metadata 260. In some embodiments, file broker 220 may use FU-File 230 to write to file 250, but use a different file utility of FU-Metadata 240 to write to metadata 260. FU-Metadata 240 may be configured as a privileged system resources that excludes any direct access to apps. In this case, app 210 can alter the data in file 250, but is prevented from altering the data in metadata 260.

System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

File broker 220 generally writes the file through one data stream, but writes the metadata associated with the file to a different data stream. Depending on the file system, each data stream may contain primary data integral to the file or just metadata. By way of example, the NTFS supports ADS, which may be configured as an embodiment of FU-metadata 240. Therefore, over the NTFS, file broker 220 can additionally write ID 212 (e.g., the MotAC) to the metadata associated with the file via an ADS. As app 210 has no access to FU-metadata 240 (i.e., the ADS in this instance), the MotAC stored in metadata 260 is immune from alteration by app 210 or other modern apps.

When app 210 calls API 222 to write to file 250, file broker 220 may automatically record ID 212 to metadata 260 associated with file 250. Further, API 222 also allows app 210 to add its opinion of file 250 into metadata 260. This allows app 210 to convey its opinion of the security status of file 250 to other apps that may access file 250 in the future.

In one embodiment, ID 212 is a security identifier assigned to app 210 as a security principal. In another embodiment, ID 212 is a unique app identification assigned by the app distribution platform. For example, the Windows Store will associate an app with a Windows Store ID. In some embodiments, opinion 214 includes an app-assigned zone identifier. In various embodiments, adding the identification of the app (e.g., MotAC) to the metadata associated with the file is mandatory, but adding the app's opinion of the file, e.g., opinion 214, to metadata 260 is optional, e.g., optionally determined by app 210. The exemplary forms of ID 212 and opinion 214 are further illustrated in connection with FIG. 3 below.

Metadata refers to information used to describe content. For example, FU-metadata 240 may store basic forms of file metadata (e.g., names, paths, modification dates, permissions, etc.) into metadata 260 in additional to the identification of app 210 (e.g., ID 212) and/or its opinion of file 250. These metadata objects are necessary to describe file 250 in the file system. In one embodiment, metadata 260 is located in a completely separate structure (e.g., the inode) from file 250.

In various embodiments, file broker 220 may be embodied as a set of compiled computer instructions or functions, program modules, computer software services, or an arrangement of processes carried out on one or more computer systems, such as computing device 800 described in connection to FIG. 8, for example. In some embodiments, the functions performed by file broker 220 are associated with one or more applications, services, or routines. In particular, such applications, services, or routines may operate, at least partially, on one or more user devices, servers, and one or more service providers, may be distributed across one or more computing devices, or may be implemented in a computing cloud (e.g., Azure®).

Moreover, these components, functions performed by these components, or services carried out by these components in system 200 may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Figure 3:
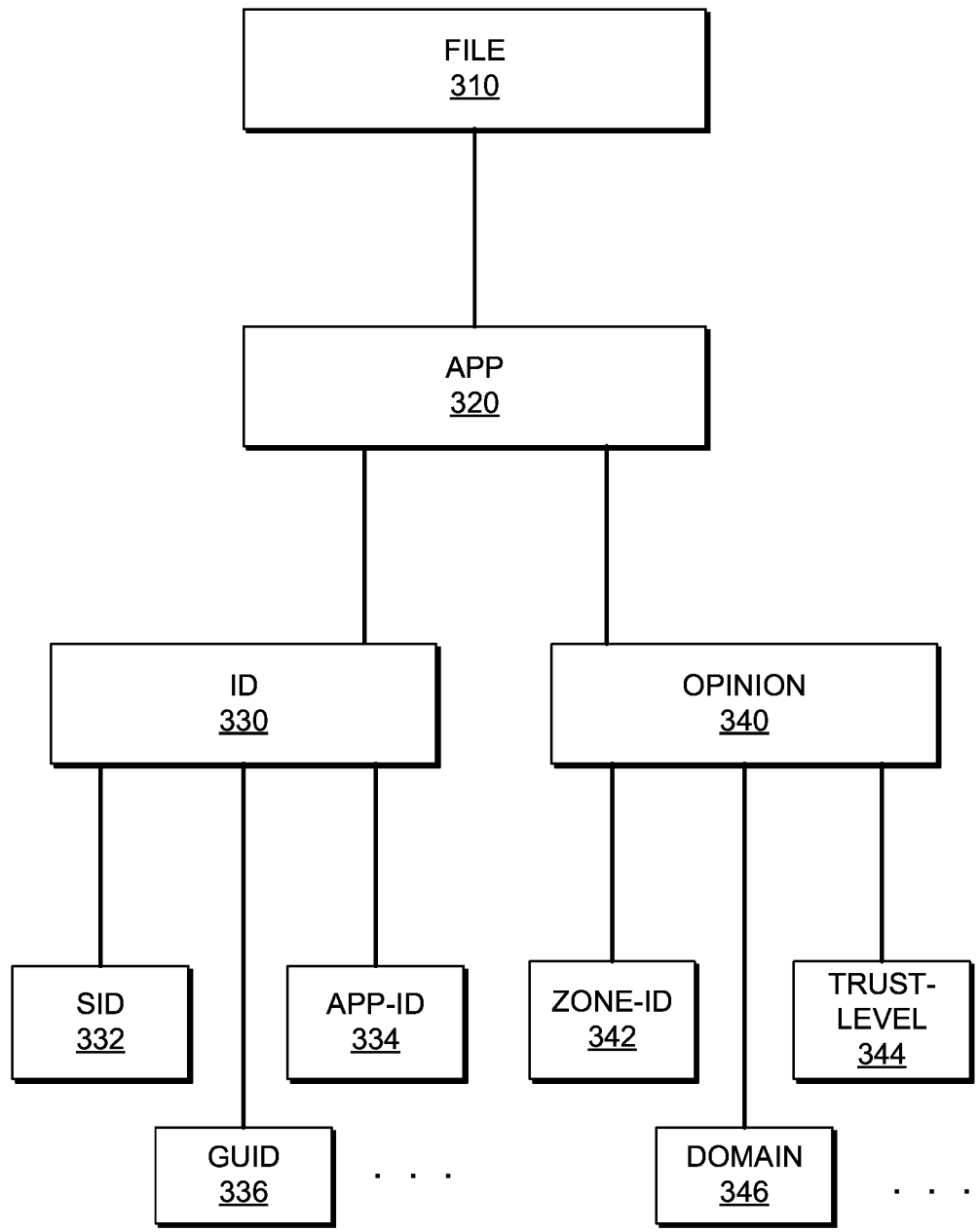
FIG. 3 is a block diagram depicting example attributes of an app for implementing aspects of the present disclosure.

Referring now to FIG. 3, a block diagram is provided depicting example attributes of an app suitable for implementing aspects of the present disclosure. App 320 here is going to write to file 310. ID 330 and opinion 340 are two example attributes of app 320 that may be recorded into metadata associated with file 310. In various embodiments, ID 330 may include at least one of SID 332, App-ID 334, or GUID 336, among other suitable identifiers that can serve as the identification of app 320. Further, opinion 340 may include at least one of zone-ID 342, trust level 344, or domain 346, among other forms of opinions.

ID 330 is used to uniquely identify a security principal. Any entity that can be authenticated by a computer system or network can become a security principal, such as a desktop application, a modern app, a user account, a computer account, a security group account, a process that runs in the security context of a user or computer account, etc. Security principals can serve as a gateway for controlling access to securable resources, e.g., based on the identifications of the security principals. A security principal may be automatically assigned a security identifier (SID) (e.g., SID 332) by the system during its initial establishment. A security principal has a single SID for life, and all properties of the principal can be associated with its SID.

In some embodiments, to enhance metadata for authenticating the provenance of a file, App-ID 334 or other type of GUID 336 may be selected as the identification of app 320. A globally unique identifier (GUID) is a unique reference number used as an identifier in computer software, typically based on the universally unique identifier (UUID) standard. App-ID 334 may be a type of GUID generated by the app store that publishes app 320, e.g., Windows Store ID. In other embodiments, other kinds of GUIDs (e.g., GUID 336) may be selected as ID 330 to represent app 320 in metadata associated with file 310.

In some embodiments, opinion 340 may include zone-ID 342, which may be one of several predefined security zones. For example, zone-ID 342 may represent a trusted zone, such as the local intranet zone, which refers to resources within an organization's firewall, e.g., computers connected to a local network. Zone-ID 342 may represent an untrusted zone, such as the restricted zone, which includes all resources that should not be trusted. Zone-ID 342 may represent a trusted sites zone, which refers to Internet sites that can be trusted, e.g., the site of a trusted business partner. Zone-ID 342 may represent an uncertain zone, such as the Internet zone, which includes resources on the Internet with uncertain trustworthiness. In other embodiments, different types of security zone classification may be defined and used as a part of opinion 340 of app 320 about file 310.

In some embodiments, opinion 340 may include trust level 344, which may use numerical values to gauge trustworthiness, such as using positive numbers and negative numbers to represent the degree of trust from app 320 to file 310. In some embodiments, opinion 340 may include domain 346, which is an identification string defined by the Domain Name System (DNS) to denote a realm of administrative control within the Internet. As a domain may represent the entire collection of resources in the domain, to denote a particular resource in the Internet, a Uniform Resource Locator (URL) may be further included in domain 346, such as used to refer to the location that file 310 was downloaded by app 320 at the first place.

Figure 4:
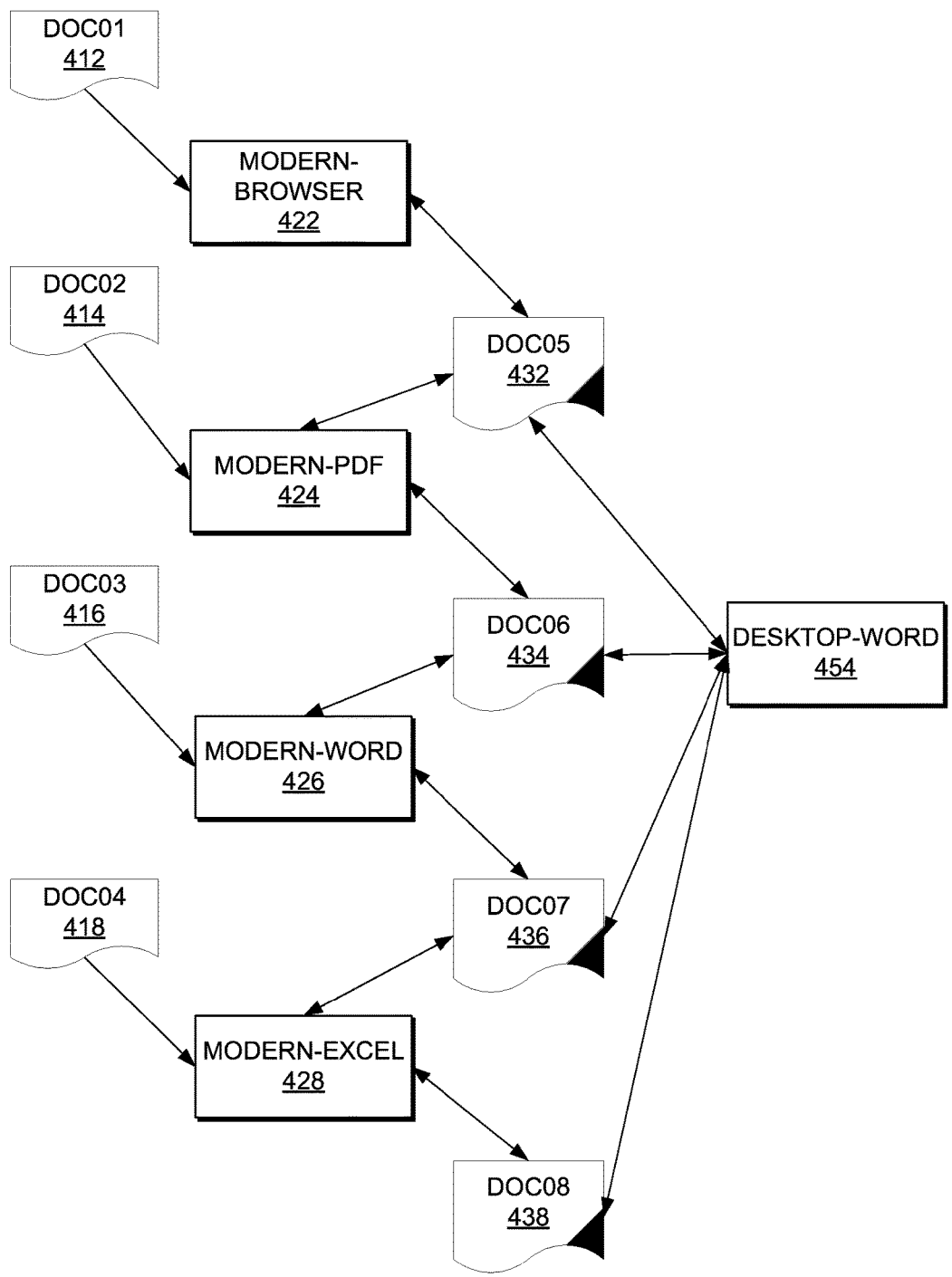
FIG. 4 is a block diagram depicting example interactions among various apps for implementing aspects of the present disclosure.

Turning now to FIG. 4, a block diagram is illustrated depicting example interactions among various apps for implementing aspects of the present disclosure. Without enhanced metadata to authentically report the provenance of a file, an app likely lacks sufficient basis to make security decisions on the file written by another app because the identity of the author of the file is unknown. On the contrary, with enhanced metadata to authentically report the provenance of the file, other apps can reason the trustworthiness of the file based on the specific app that wrote the file and/or the opinion of the specific app about the file.

When modern browser app 422 retrieves doc01 412 from the Internet and writes it into a file system as doc05 432, the file broker writes the identification of modern browser app 422 (e.g., a SID, an App-ID, or another GUID) as well as its opinion of doc01 412 (e.g., from Internet zone) into metadata associated with doc05 432. When modern PDF app 424 retrieves doc02 414 from its Intranet and writes it into the file system as doc06 434, the file broker writes the identification of modern PDF app 424 and optionally its opinion of doc06 434 (e.g., originally from Intranet zone) into metadata associated with doc06 434.

When modern Word app 426 retrieves doc03 416 from a trusted site on the network and writes it into a file system as doc07 436, the file broker writes the identification of modern Word app 426 and its opinion of doc07 436 (e.g., originally from a trusted site) into metadata associated with doc07 436. When modern Excel app 428 retrieves doc04 418 from an untrusted location on the Internet and writes it into a file system as doc08 438, the file broker writes the identification of modern Excel app 428 and its opinion of doc08 438 (e.g., from an untrusted location) into metadata associated with doc05 438.

Subsequently, modern PDF app 424 tries to access doc05 432. Before opening doc05 432, modern PDF app 424 requests the file broker to retrieve the information of the identification of the app that wrote doc05 432 and its opinion of the file from the metadata associated with doc05 432. Once modern PDF app 424 learns that the provenance of doc05 432 is associated with a browser and the file is downloaded from the Internet, modern PDF app 424 assigns a low trust level to doc05 432, then opens doc05 432 in a restricted mode.

Similarly, modern Word app 426 may try to access doc06 434. After sending an indication to the file broker to write to doc06 434, the file broker may prompt modern Word app 426 with the identification of modern PDF app 424 that wrote doc06 434 and its opinion of the file (e.g., Intranet zone). Even though the opinion related to the Intranet zone indicates that modern PDF app 424 trusts doc06 434, modern Word app 426 may nonetheless treat doc06 434 as untrusted because modern Word app 426 does not trust modern PDF app 424.

However, if modern Word app 426 attempts to access doc08 438, modern Word app 426 may recognize the provenance of doc08 438 is associated with a trusted sibling (modern Excel app 428) in the same modern Office suite. Although modern Excel app 428 indicates doc08 438 is originally from an untrusted location, modern Word app 426 may still allow doc08 438 to open in an unrestricted mode because modern Word app 426 believes that modern Excel app 428 likely have sanitized doc08 438 in its previous encounter with doc08 438.

More interestingly, desktop Word app 454 may need to read and write to doc05 432, doc06 434, doc07 436, or doc08 438 from time to time. In one embodiment, desktop Word app 454 may have assigned respective trust levels to modern browser app 422, modern PDF app 424, modern Word app 426, and modern Excel app 428. Therefore, desktop Word app 454 may make a security decision when reading doc05 432, doc06 434, doc07 436, or doc08 438 corresponding to the respective trust levels to modern browser app 422, modern PDF app 424, modern Word app 426, and modern Excel app 428. In another embodiment, desktop Word app 454 may prompt users to select a trust level to the file (e.g., doc06 434) based on the fact that the file was last modified by, e.g., modern PDF app 424.

In yet another embodiment, desktop Word app 454 may open and then write back the file, in which the file broker will add the identification of desktop Word app 454 to the metadata associated with the file. In yet another embodiment, desktop Word app 454 may write back the file in a traditional way and effectively remove any metadata revealing the provenance of the file. In this instance, a file without any metadata revealing the provenance of the file may be treated by other apps as fully trusted based on the assumption that the file must have been written by a trusted application to the system. In this way, desktop Word app 454 acts as a sanitizer to remove the risks associated with a file.

Here, with enhanced metadata to authentically report the provenance of the file, apps can make some very granular security decisions, whereas previously there was not enough information to make such granular decisions. The enhanced metadata to authentically report the provenance of the file also gives apps flexibility to make trust decisions, including the flexibility to trust two different apps from the same suite as well as the flexibility to trust apps from different vendors. Therefore, such enhanced metadata becomes a substantial improvement in the state-of-the-art of computing security or trusted computing.

Figure 5:
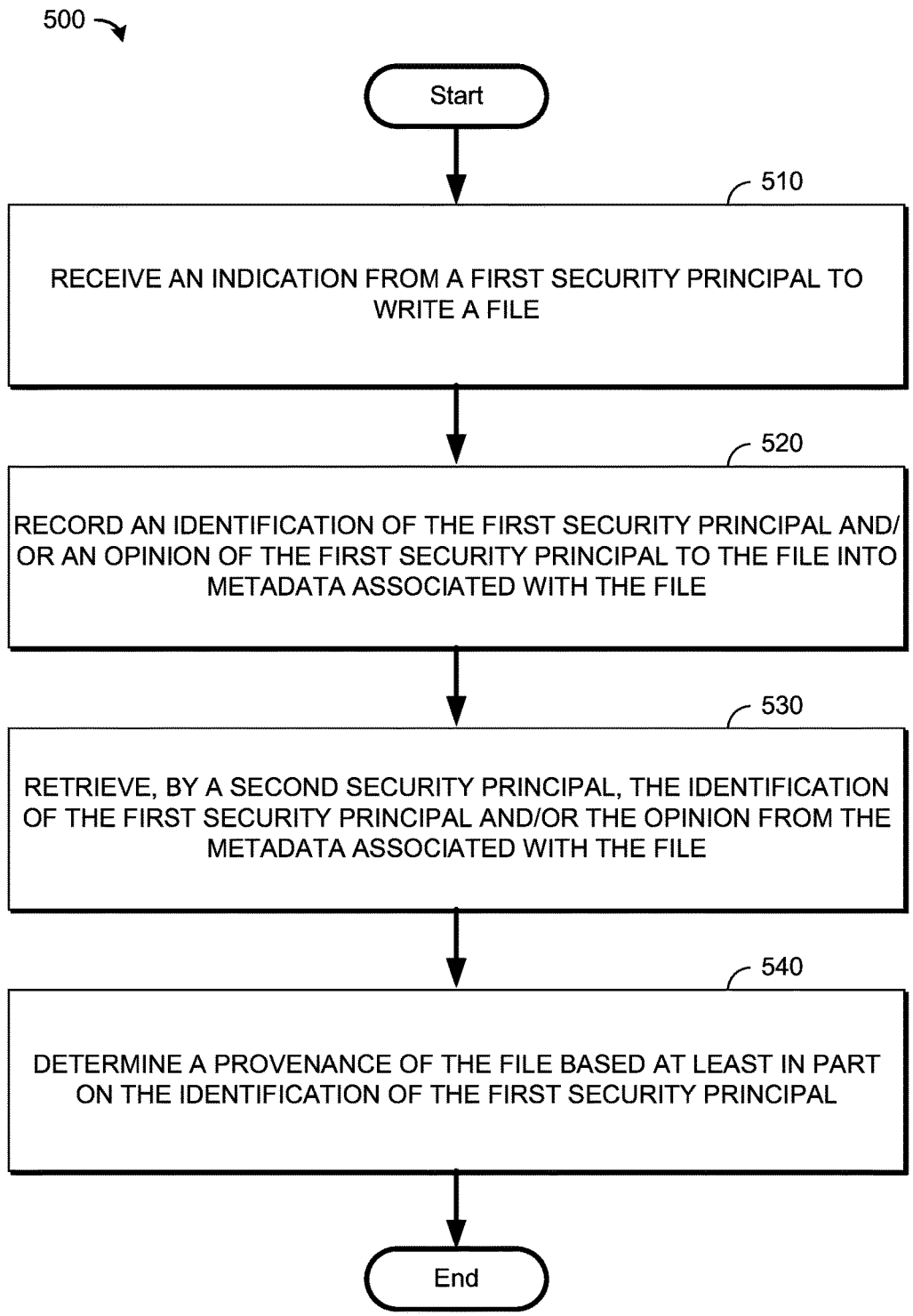
FIG. 5 is a flow diagram showing an exemplary process of authenticating the provenance of a file, in accordance with an aspect of the technology described herein.

Turning now to FIG. 5, a flow diagram is illustrated showing an exemplary process of authenticating the provenance of a file, in accordance with an aspect of the technology described herein. Process 500 may be performed by one or more computing devices, such as system 200 of FIG. 2. In various embodiments, the execution of process 500 may be facilitated by a computing environment, such as operating environment 100 of FIG. 1.

At block 510, an indication of a first security principal to write a file may be received, e.g., by file-broker 220 of FIG. 2. In some embodiments, a write system call from the first security principal is the indication that the first security principal is going to output data to the file system. The write system call will also provide the argument of the file descriptor, the pointer to a buffer where the data is stored, and the number of bytes to write from the buffer. In some embodiments, an open file system call from the first security principal can serve as the indication that the first security principal is going to output data to the file system. By way of example, the open file system call may have an argument to show a request to write from the first security principal compared to read only permission. In other embodiments, file-broker 220 may provide a specific function to allow apps to inform their intention to write to a file.

At block 520, an identification of the first security principal and/or an opinion of the first security principal to the file may be recorded into the metadata associated with the file, e.g., by file-broker 220 of FIG. 2. In some embodiments, file-broker 220 can invoke relevant file utilities to record the identification of the first security principal into the metadata associated with the file as soon as file-broker 220 receives the indication that the first security principal plans to write to the file. Therefore, regardless whether the first security principal actually succeeded in writing anything to the file, the file will be marked as being worked by the first security principal.

In some embodiments, file-broker 220 will record the identification of the first security principal into the metadata associated with the file only if the first security principal succeeded in changing any part of the file data, excluding the metadata of the file. In this case, even if a modern app may issue numerous write system calls to a file that is locked for writing, the provenance of the file will still be prevented from any change. Therefore, although the file permission setting, file-broker 220 can prevent malicious code to purposely alter the MotAC, as an example.

Further, in some embodiments, file-broker 220 allows an exclusive app identification to be associated with a file, e.g., by setting an exclusion flag with the MotAC in the metadata associated with a file. Instead of relying on the general permission setting associated with a file, the notion of an exclusion flag offers apps another option to own the exclusive right to write to a file or even read the file. For instance, a security mechanism is offered by file-broker 220 to check the exclusion flag. When the exclusion flag is set, file-broker 220 will only allow the same app to read or write the file. In this case, an app can become the exclusive owner of a file, especially if the file needs to be protected from alteration by other apps.

At block 530, a second security principal may retrieve the identification of the first security principal and/or the opinion of the first security principal about the file from the metadata associated with the file, e.g., by querying file-broker 220 of FIG. 2. File-broker 220 provides a system call interface, APIs, other mechanisms that allow apps to query the identification (e.g., MotAC) of the app that wrote the file and the app's opinion of the file (e.g., the app-assigned zone ID).

Modern apps must be prevented from directly altering the metadata associated with the file in terms of the identification of the app that wrote the file. Therefore, when file-broker 220 returns the identification (e.g., MotAC) of the app that wrote the file, such query result is generally trusted by the querying app. Accordingly, the querying app can confidently ascertain the provenance of the file and the app-assigned opinion of the file.

At block 540, the second security principal may determine a provenance of the file based at least in part on the identification of the first security principal. The identification of the first security principal is a globally unique identifier or universally unique identifier, which are usually stored as 128-bit values in various embodiments. As an example, if the identification of the first security principal (a modern app) is the GUID generated by the Windows Store when the modern app is certified for listing in the Windows Store, file-broker 220 may retrieve the Windows Store ID, and authentically report the identification through an appropriate call to the interface provided by the Windows Store or through a locally stored database of known Windows Store IDs. Further, file-broker 220 may gather related information of the modern app based on the package manifest schema reference, which provides details for each element, attribute, and data type that defines the schema for the app package manifest for Windows Store apps. In other embodiments, when the identification of the first security principal is embodied in different formats, similar mechanisms may be provided for file-broker 220 to authentically report the identification of the first security principal.

Consequently, the authentic provenance of the file, i.e., who wrote the file, can be determined based on the true identity associated with the identification of the first security principal. Based on the authentic provenance of the file, the querying app can take appropriate measures to handle the file, such as opening the file in a sandbox, access the file in a restricted mode, or disable certain functions when handling the file. In some embodiments, the querying app makes security decisions further based on the opinion of the file found in the metadata associated with the file. As an example, if a desktop application determines the file was last written by a trustworthy modern app, further the modern app left an opinion of the file as full trusted, then the desktop application may also grant the file a trusted status and access the file in an unrestricted mode.

Figure 6:
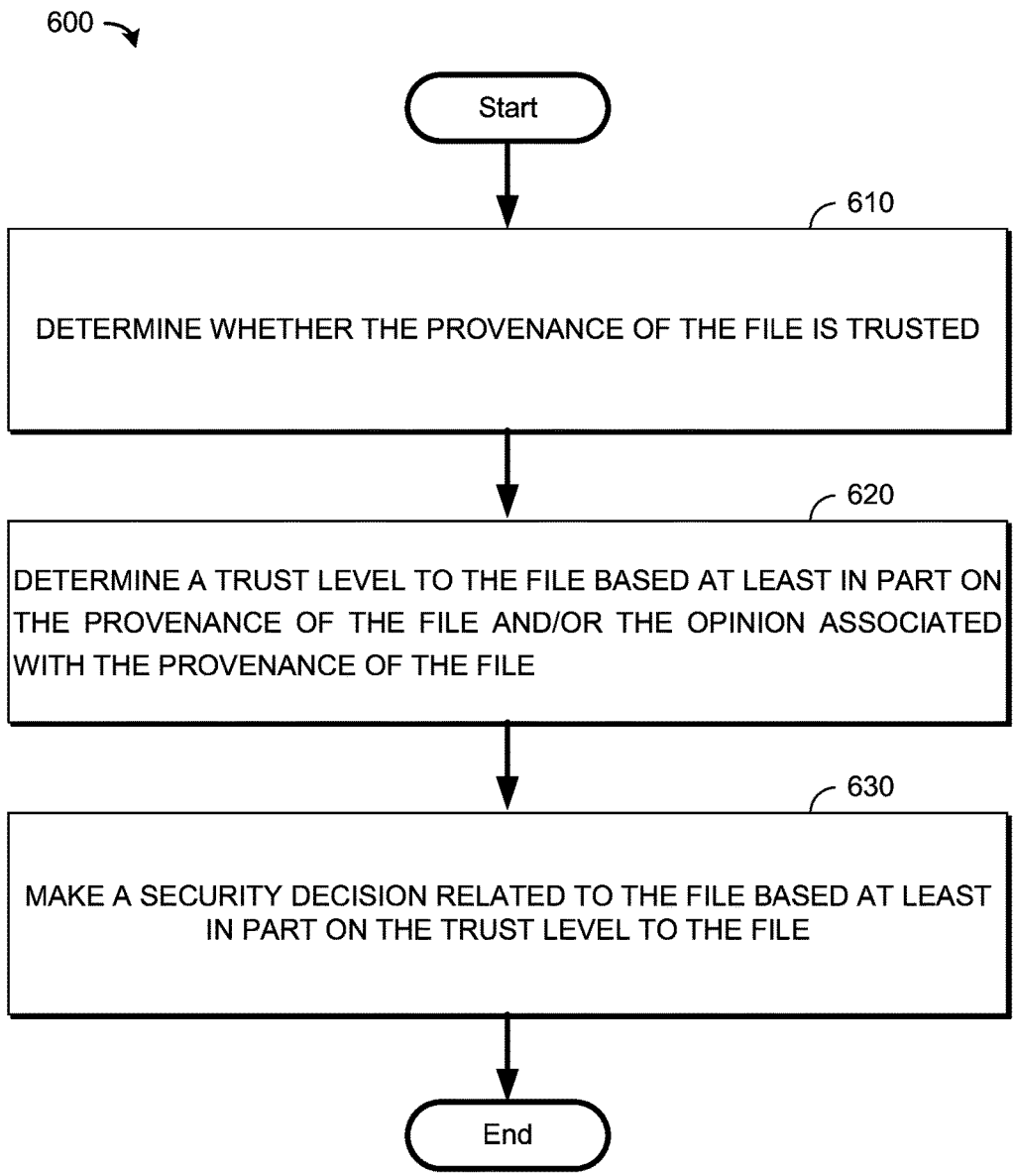
FIG. 6 is a flow diagram showing an exemplary process of applying security applications, in accordance with an aspect of the technology described herein.

Turning now to FIG. 6, a flow diagram is illustrated showing an exemplary process of applying security applications in accordance with an aspect of the technology described herein.

At block 610, whether the provenance of the file is trusted may be determined, e.g., by the inquiring security principal directly or facilitated by the file broker or other suitable components in the operating system. The trustworthiness of the file is related to whether the app or apps that manipulated the file can be trusted. In some embodiments, the inquiring app can determine the trustworthiness of the provenance of the file based on the identification of the app that wrote the file. In some embodiments, the file broker determines and passes the trustworthiness of the provenance of the file to the inquiring app. To determine the trustworthiness of the provenance of the file, the inquiring app or the file broker can inquire a public neutral authority that has information (e.g., ranking) of the trustworthiness of various apps, similar to a computer virus detection authority hosting information of all known computer viruses. In this regard, the Window Store can serve as the public neutral authority to provide an opinion of whether an app can be trusted, e.g., based on statistical data collected from various users and devices. Alternatively, the inquiring app or the file broker may access a local database, e.g., a lookup table, to retrieve the trustworthiness of the app that wrote the file.

At block 620, a trust level to the file may be determined based at least in part on the provenance of the file and/or the opinion associated with the file, e.g., by the inquiring security principal. In various embodiments, respective perspectives of different inquiring security principals are different toward the same app that wrote the file, e.g., based on the relationship between the inquiring security principal and the app that wrote the file. By way of example, Microsoft Word may treat Word Mobile app, Excel Mobile app, etc. as close relatives in a common Office suite, and accordingly gives a higher trust level to the files wrote by these close relatives than to the files wrote by other unrelated modern apps.

Further, the inquiring security principal can consider the opinion of the file provided by the app that wrote the file when such opinion is available. In one embodiment, the opinion is manifested as one of the zone identifiers, such as INTRANET, TRUSTED, INTERNET, UNTRUSTED, etc. In another embodiment, the opinion is manifested as numerical values reflecting a sliding scale of trust. In other embodiments, the opinion may contain related information, such as the original URL of the file. Such opinions may further sway the inquiring security principal to adjust the trust level assigned to the file. By way of example, Microsoft Word likely trusts Word Mobile app. Therefore, when Word Mobile app marks the file with the zone identifier of INTRANET, Microsoft Word may open the file in a normal mode and allows the file to access regular resources.

In various embodiments, a weighted function can be applied for the inquiring security principal to compute the trust level of the file. By way of example, the inquiring security principal may assign a weight of trust to an app, and such weight of trust can be added or multiplied with the numerical value corresponding to the opinion. For example, the zone identifiers of INTRANET, TRUSTED, INTERNET, and UNTRUSTED may correspond to numerical values of 1, 0.75, 0.5, and 0.25. By way of example, Microsoft Word may assign a weight of trust (e.g., 0.9) to Word Mobile app, and the opinion of Word Mobile app about the file is INTERNET. Therefore, Microsoft Word may deem the trust level to the file as 0.45. In other embodiments, different functions with different weights can be applied to compute such trust levels.

At block 630, the inquiring security principal makes a security decision related to the file based at least in part on the trust level to the file. In some embodiments, a set of recommended threshold values may be used to guide the inquiring security principal to make the security decision. By way of example, one file with the trust level greater than a threshold value (e.g., 0.5) may be opened in an unrestricted mode, but another file with the trust level less than the threshold value (e.g., 0.5) may be opened in a restricted mode. In some embodiments, the inquiring security principal may make a dynamic security decision based on the device type, the operating system, the computing resource constrains, the geolocation of the inquiring security principal, the storage location of the file, etc. In various embodiments, the inquiring security principal may prompt the user for making a security decision to dispose the file, e.g., after presenting the provenance of the file, the opinion associated with the file, or the trust level determined for the file, etc. to the user. In this way, the user can make an informed decision to dispose the file.

Figure 7:
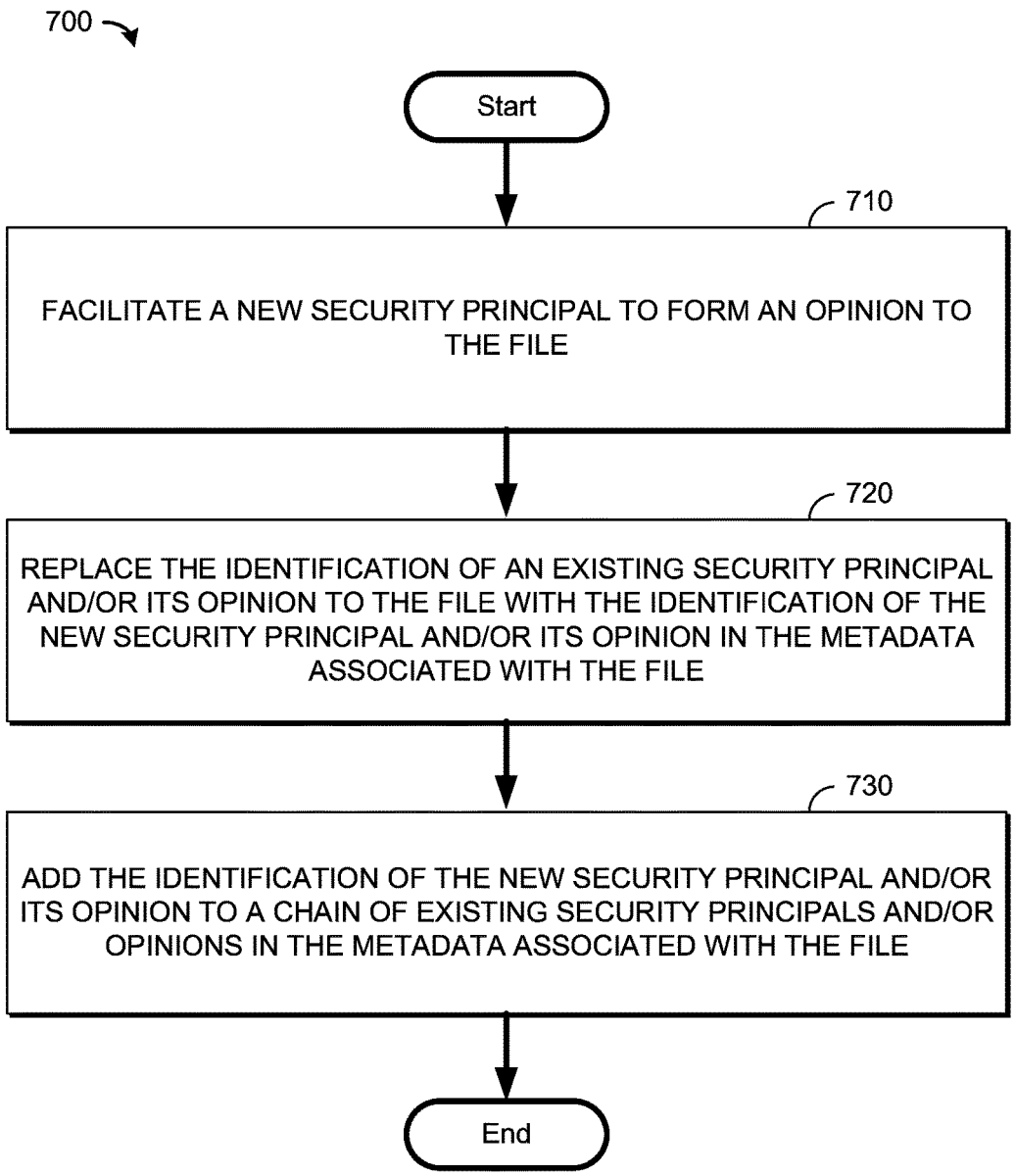
FIG. 7 is a flow diagram showing an exemplary process of facilitating opinion management, in accordance with an aspect of the technology described herein.

Turning now to FIG. 7, a flow diagram is illustrated showing an exemplary process 700 for facilitating opinion management for apps that write to a file system.

At block 710, a security principal is to form an opinion about the file. The security principal may develop its opinion based on the existing identification of the app that wrote the file. By way of example, Microsoft Word may trust a PDF file written by Microsoft Mobile Office more than another PDF written by an unknown PDF distiller. The security principal may develop its opinion based on the source of the file. By way of example, the security principal may fully trust the files created by itself, but distrust a file downloaded from Internet. Even for the files downloaded from Internet, the security principal may further attach finer trust levels to different files, e.g., based on the URL or domain associated with the file. By way of example, the security principal may access a white list of domains, which have a reputation to provide files without major security issues, and assign a higher trust level to files from those trusted domains than files from other domains.

In various embodiments, the opinion development process may be facilitated by other components in the operating system, e.g., the file-broker 220 of FIG. 2. By way of example, the file broker may provide the existing identification of the app that wrote the file or the aforementioned white list of trusted domains to the inquiring security principal, so that the security principal can form an opinion about the file.

At block 720, the file broker may replace the identification of an existing security principal and/or its opinion to the file with the identification of the present security principal and/or its opinion in the metadata associated with the file. In some embodiments, only the most recent app that manipulated the file is recorded in the metadata associated with the file. Therefore, the file broker will replace the identification of an existing security principal and/or its opinion to the file with the identification of the present security principal and/or its opinion in the metadata associated with the file. In this regard, the opinion of the present security principal may reflect the trustworthiness of previous security principals that have manipulated the file. For example, an untrusted app, which is in the middle of a chain of apps that have written to a file, may nonetheless cause a trusted app at the end of the chain of apps to inherit a low opinion of the file. However, in some embodiments, a trusted app may discard the previous opinion and cause the trustworthiness of the file to appreciate after writing to the file. The rational here is that the trusted app may be capable of removing the potential risk associated with the file, therefore sanctioned the trustworthiness of the newly written file.

At block 730, the file broker may add the identification of the present security principal and/or its opinion to a chain of existing security principals and/or opinions in the metadata associated with the file. In some embodiments, the chain of custody (CoC) of the file is maintained in the metadata associated with the file, e.g., as a linked list. As an example, the most recent N apps that wrote to a file is kept in the metadata associated with the file, wherein the number N may be determined by the system, e.g., based on the file type, or set by the most recent app that wrote to the file. When the identifications of a chain of security principals are maintained, the inquiring security principal can develop a more completed understanding of the trustworthiness of the file. In one embodiment, the inquiring app makes security decisions about the file based on the least trusted app or trust level in the chain of custody. In other embodiments, the inquiring app makes security decisions about the file based on the most recent app that wrote to the file, similar to block 720.

Figure 8:
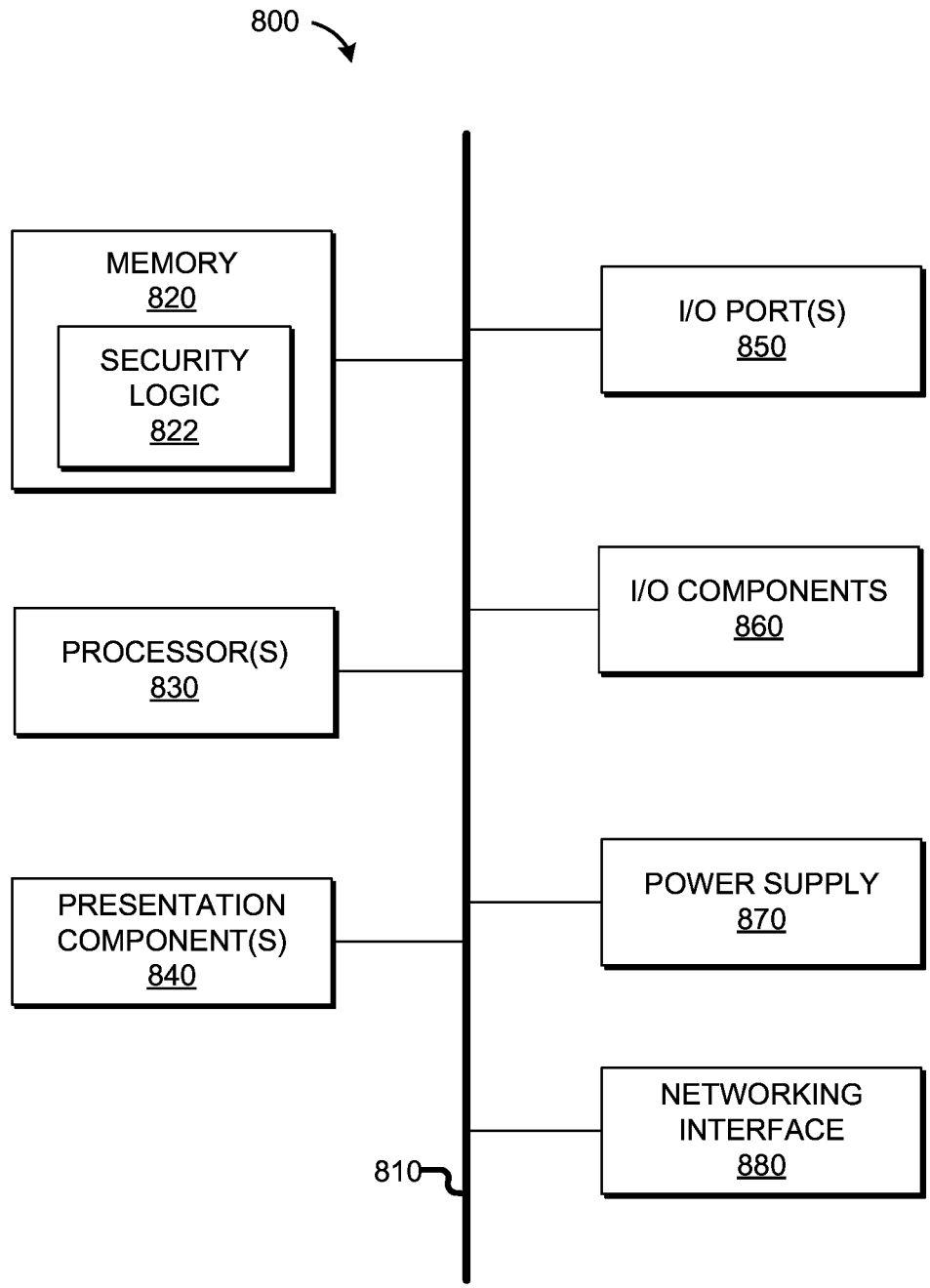
FIG. 8 is a block diagram of an exemplary computing environment suitable for use in implementing aspects of the technology described herein.

Referring to the drawings in general, and initially to FIG. 8 in particular, an exemplary operating environment for implementing aspects of the technology described herein is shown and designated generally as computing device 800. Computing device 800 is but one example of a suitable computing environment and is not intended to suggest any limitation as to the scope of use of the technology described herein. Neither should the computing device 800 be interpreted as having any dependency or requirement relating to any one or combination of components illustrated.

The technology described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are connected through a communications network.

With continued reference to FIG. 8, computing device 800 includes a bus 810 that directly or indirectly couples the following devices: memory 820, one or more processors 830, one or more presentation components 840, input/output (I/O) ports 850, I/O components 860, and an illustrative power supply 870. Bus 810 represents what may be one or more busses (such as an address bus, data bus, or a combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 820 includes computer storage media in the form of volatile and/or nonvolatile memory. The memory 820 may be removable, non-removable, or a combination thereof. Exemplary memory includes solid-state memory, hard drives, optical-disc drives, etc. Computing device 800 includes one or more processors 830 that read data from various entities such as bus 810, memory 820, or I/O components 860. Presentation component(s) 840 present data indications to a user or other device. Exemplary presentation components 840 include a display device, speaker, printing component, vibrating component, etc. I/O ports 850 allow computing device 800 to be logically coupled to other devices, including I/O components 860, some of which may be built in.

In various embodiments, memory 820 includes, in particular, temporal and persistent copies of security logic 822. Security logic 822 includes instructions that, when executed by one or more processors 830, result in computing device 800 performing data privacy management functions, such as, but not limited to, process 500, 600, or 700. In various embodiments, security logic 822 includes instructions that, when executed by processor(s) 830, result in computing device 800 performing various functions associated with, but not limited to, file-broker 220 in connection with FIG. 2.

In some embodiments, one or more processors 830 may be packaged together with security logic 822. In some embodiments, one or more processors 830 may be packaged together with security logic 822 to form a System in Package (SiP). In some embodiments, one or more processors 830 can be integrated on the same die with security logic 822. In some embodiments, processors 830 can be integrated on the same die with security logic 822 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 830 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

Computing device 800 may include networking interface 880. The networking interface 880 includes a network interface controller (NIC) that transmits and receives data. The networking interface 880 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 880 may include a wireless terminal adapted to receive communications and media over various wireless networks. Computing device 800 may communicate via wireless protocols, such as Code Division Multiple Access (CDMA), Global System for Mobiles (GSM), or Time Division Multiple Access (TDMA), as well as others, to communicate with other devices via the networking interface 880. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. A computing system, comprising:
a file broker configured to receive a notification, from a first security principal, indicating to write a file to a file system;

a first file utility configured to write the file, the first file utility being accessible to the first security principal via the file broker; and a second file utility configured to write an identification of the first security principal and a trust level to the file from the first security principal into metadata associated with the file, the second file utility being inaccessible to the first security principal for writing.

2. The computing system of claim 1, wherein the second file utility is further configured to replace an existing identification of another security principal in the metadata associated with the file with the identification of the security principal.

3. The computing system of claim 2, wherein the second file utility is further configured to replace an existing trust level to the file, from the another security principal in the metadata associated with the file, with the trust level to the file from the first security principal.

4. The computing system of claim 1, wherein the second file utility is further configured to add the identification of the first security principal to a chain of existing security principals in the metadata associated with the file.

5. The computing system of claim 4, wherein the second file utility is further configured to add the trust level to the file from the first security principal to a chain of existing trust levels to the file from respective other security principals in the metadata associated with the file.

6. The computing system of claim 1, further comprising:
a second security principal configured to retrieve, via the file broker, the identification of the first security principal from the metadata; and to determine a provenance of the file based at least in part on the identification of the first security principal.

7. The computing system of claim 6, wherein the second security principal is further configured to access information of a plurality of trusted provenances, and the second security principal is further configured to determine the provenance of the file is one of the plurality of trusted provenances.

8. The computing system of claim 6, wherein the second security principal is further configured to retrieve, via the file broker, the trust level of the first security principal, and to make a security decision for accessing the file based at least in part on the provenance of the file and the trust level to the file from the first security principal.

9. The computing system of claim 6, wherein the first security principal is a first application running in a restricted mode, the second security principal is a second application running in an unrestricted mode.

10. A computer-implemented method, comprising:
receiving a notification from a security principal to write a file to a file system;
recording, via an operating system, a unique identifier of the security principal into metadata associated with the file;
retrieving, via the operating system, the unique identifier of the security principal from the metadata; and
determining a provenance of the file based at least in part on the unique identifier of the security principal.

11. The method of claim 10, further comprising:
making a security decision for accessing the file based at least in part on the provenance of the file.

12. The method of claim 10, further comprising:
determining a trust level to the file based at least in part on the provenance of the file.

13. The method of claim 10, wherein the recording comprises recording the unique identifier of the security principal into the metadata after receiving the notification but before the file is written by the security principal to the file system.

14. The method of claim 10, wherein the recording comprises recording an opinion of the security principal about the file into the metadata.

15. The method of claim 14, wherein the opinion comprises at least one zone identifier.

16. One or more computer storage hardware media comprising computer-implemented instructions that, when used by one or more computing devices, cause the one or more computing devices to:
receive a notification from a security principal to write a file to a file system;
mandatorily record an identification of the security principal into metadata associated with the file wherein the security principal is prevented from altering the metadata; and
write an opinion of the security principal about the file into the metadata associated with the file in response to a request of the security principal to write the opinion.

17. The one or more computer storage media of claim 16, wherein the security principal is a first security principal, and the instructions further cause the one or more computing devices to:
retrieve, by a second security principal, the identification of the first security principal from the metadata; and
determine a provenance of the file based at least in part on the identification of the security principal.

18. The one or more computer storage media of claim 16, wherein the security principal is a first security principal, and the instructions further cause the one or more computing devices to:
retrieve, by a second security principal, the opinion of the first security principal about the file from the metadata; and
make a security decision to access the file by the second security principal based on the provenance of the file and the opinion of the first security principal about the file.

19. The one or more computer storage media of claim 16, wherein the instructions further cause the one or more computing devices to:
facilitate the security principal to form the opinion based on a domain associated with the file.

20. The one or more computer storage media of claim 16, wherein the instructions further cause the one or more computing devices to:
replace an existing identification of another security principal in the metadata associated with the file with the identification of the security principal.

* * * * *